2,093,842

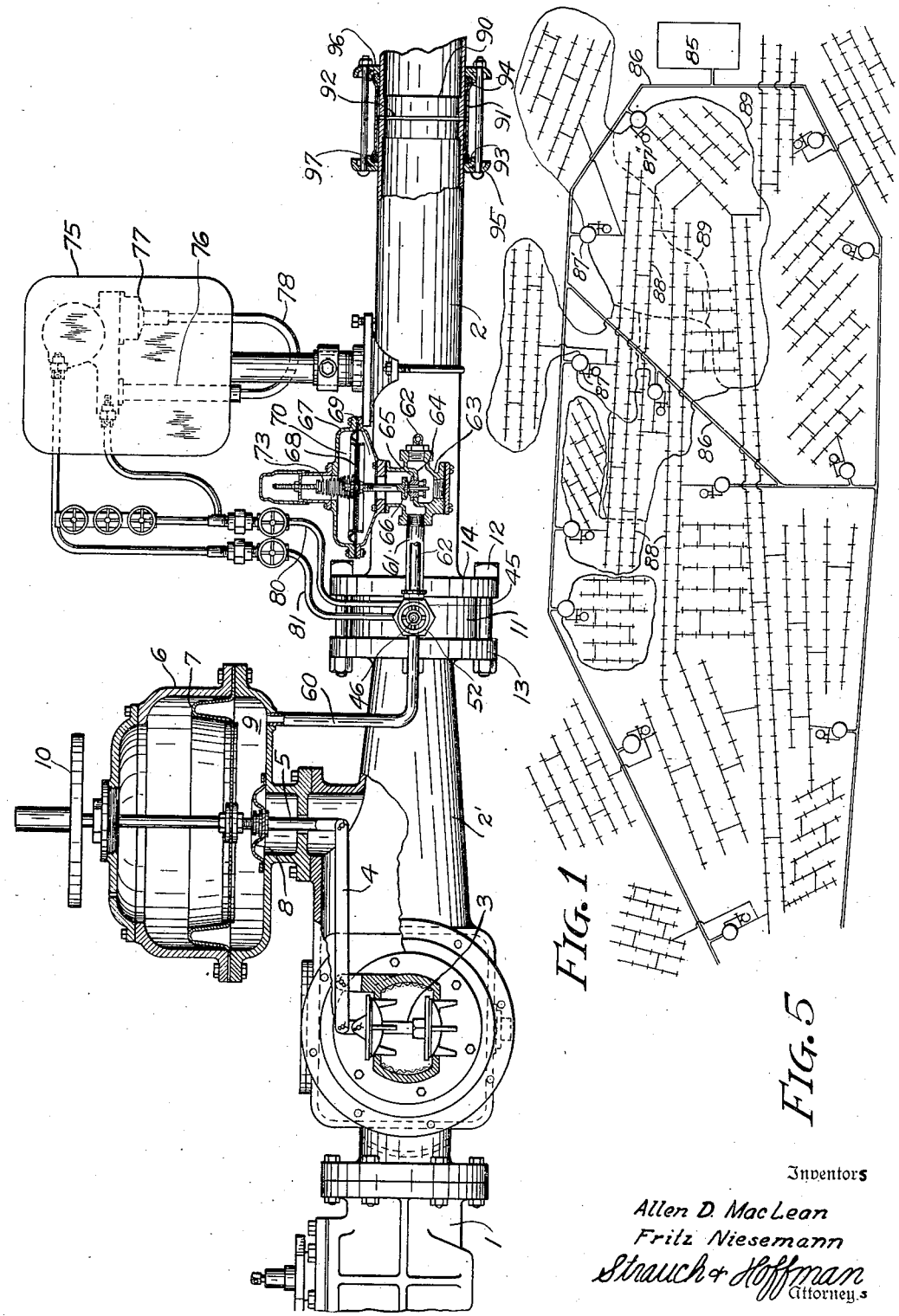

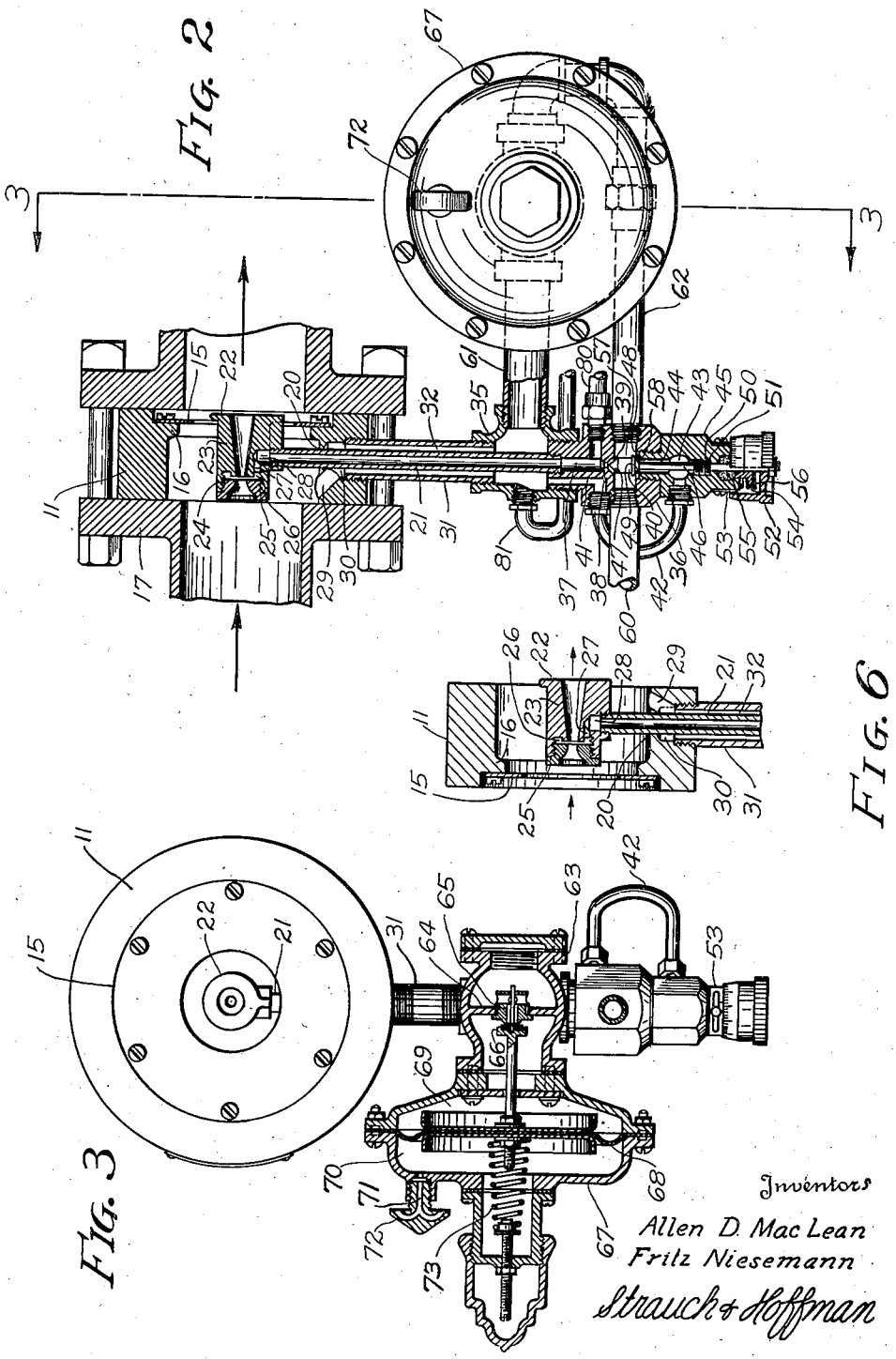

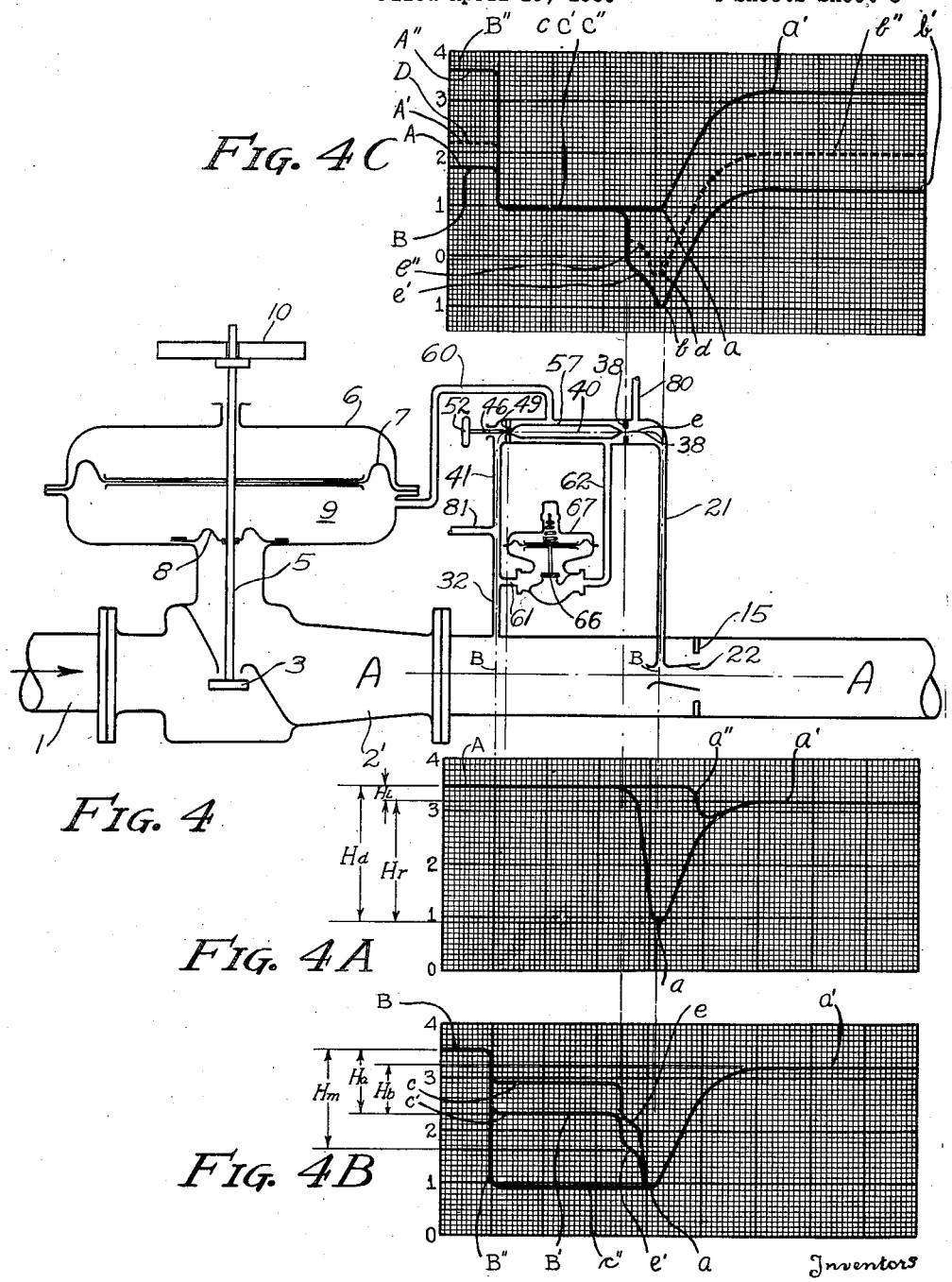

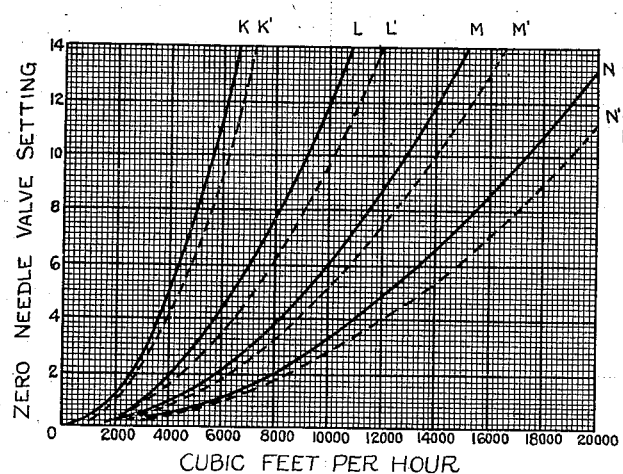
FIG. 7
FIG. 9
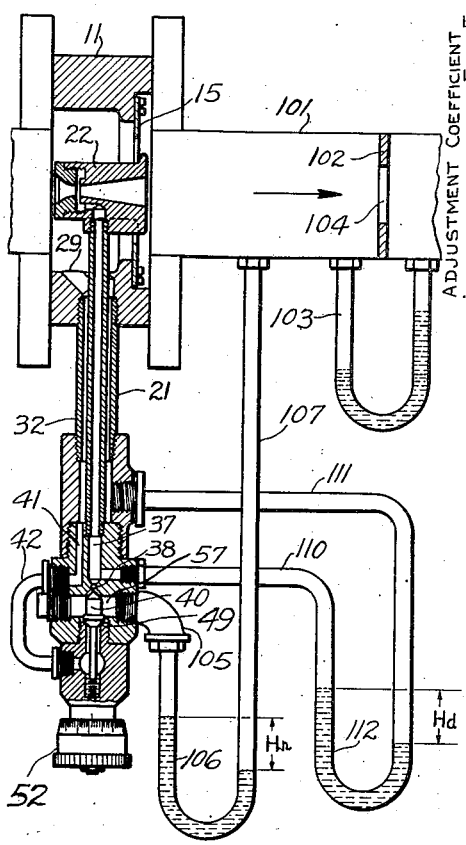
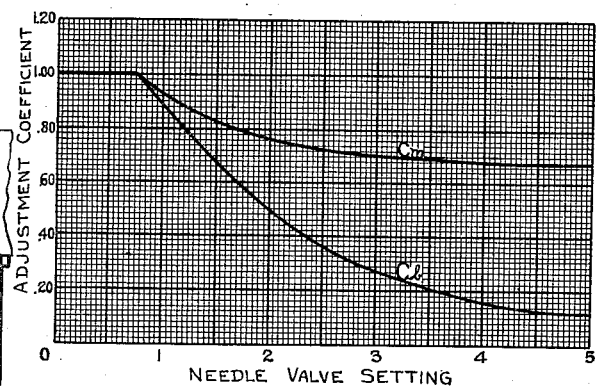
FIG. 8
Inventors
Allen D. MacLean
Fritz Niesemann
Strauch & Hoffman
Attorneys Patented Sept. 21, 1937

UNITED STATES PATENT OFFICE 2,093,842

FLUID DISTRIBUTION SYSTEM

Allen D. MacLean, Wilkinsburg, and Fritz Niesemann, Pittsburgh, Pa., assignors to Pittsburgh Equitable Meter Company, Pittsburgh, Pa., a corporation of Pennsylvania Application April 19, 1933, Serial No. 666,906

11 Claims. (Cl. 73—199)

This invention relates to fluid distribution systems which are intended to maintain the pressure substantially constant at the low pressure point in the system by automatically varying the fluid pressure in the system in accordance with the withdrawal of fluid therefrom.

When new gas distribution pipe systems are laid in a district the pipe is selected of larger diameter than called for by present requirements in expectation of an increase in gas consumption by the district as it develops and the use of gas appliances increase. The gas pressure at these districts is controlled by the usual diaphragm type of gas pressure regulator which maintains the pressure constant in the line. As the demand increases in such a community the point eventually is reached where the pipe main is not large enough to supply the demand at peak loads and maintain the required pressure. Many old systems have already reached this stage of development and the remedy lies in the laying of new pipe of larger diameter or in boosting the pressure at peak loads to maintain the required pressure at the points of lowest pressure in the line.

Heretofore, the pressure in the low pressure main has been increased or boosted by manually loading the district regulators by the addition of weights to the diaphragm, and it has been proposed to automatically boost the pressure by employing a Venturi tube, the throat of the Venturi tube being connected to the diaphragm chamber of the regulator to govern its action in accordance with this pressure drop. The district regulators are usually housed in concrete underground pits which are costly to construct and therefore are made as small as feasible. The use of a Venturi tube for governing the regulator would require enlarging the pit to include the Venturi tube, and therefore is costly.

Further, there usually is no data available as to the rate of flow required in such districts, and the required dimensions of Venturi tube can be determined only by trial and test. The insertion and removal of Venturi tubes is very difficult, and further, such tubes are very costly to manufacture because of the great accuracy required for the interior of the tube. Other low pressure producing elements heretofore proposed have a smaller percentage regain in pressure than a Venturi tube and therefore require that an increase in the pipe line pressure to the regulator inlet be supplied in order to maintain the desired pressure boost at the outlet. This usually requires the installation of additional compressors.

Furthermore, where the regulators are located relatively close to each other there may be a tendency for one or more of the regulators to carry more than its share of the load, and without flow data of the pipe line it is practically impossible to properly set the regulators equipped with booster attachments.

Heretofore, it has not been possible directly to study the distribution system to determine which regulators were bearing the load of the line. Because of the low pressure employed an orifice meter or similar differential pressure recording apparatus could not be employed. Ordinarily, it requires a differential pressure of about five inches of water to operate an orifice meter and as the usual pressure in the distribution mains is about six inches of water, and the use of a Venturi tube being almost prohibitive, any other known device which will create a differential pressure of five inches will seriously interfere with the capacity of the line to carry gas. Direct metering also is not feasible because of the cost of displacement meters and because of the pressure losses caused by such meters. Further, even if a differential pressure is created high enough to operate a metering device the variations in pressure in the line are liable to decrease this pressure difference to the point where the meter ceases to function.

In distribution systems of this type it is desirable to maintain a predetermined minimum pressure in the distribution mains during periods of minimum demand, and gradually increase the pressure as demand increases so as to maintain within a predetermined range, or substantially constant, the pressure in the distribution main at the point in the line of lowest pressure, which usually is the point farthest removed from the regulator. Also, it is desirable that this increase in pressure, which technically is called the "boost", shall not go above a predetermined maximum, so that one regulator cannot build up a pressure in the line which would render partially inoperative the other regulators and thus bear all the load, or build up an excessive pressure in the line.

According to the present invention the pressure conditions at the point of lowest pressure in the distribution main during minimum demand is simulated at a point in the main near the regulator and the pressure at such point is transmitted to the regulator which is set to maintain constant this simulated pressure and vary the pressure in the main in accordance therewith under variable conditions of demand in the main. The element employed to create the low pressure point in the main is short enough to be used in existing regulator pits and has a high percentage of pressure recovery so that it is superior to other short devices heretofore proposed for this purpose. Further, adjustment is provided whereby the maximum predetermined boost, or any pressure intermediate of the simulated low pressure and the maximum predetermined boost may be transmitted to the regulator, and provision also is made to transmit the effect of full boost to the regulator to maintain constant the pressure in the main at periods of high demand.

The adjustment of the system as a whole is facilitated by an improved measuring system which also forms a part of the present invention and in combination with the regulator enables a study to be made of the system to substantially equalize the load on the various regulators. The element employed for providing a pressure drop in the low pressure main produces a large pressure drop for small variations of flow, and a portion or the whole of the pressure drop can be employed in connection with various pressure responsive devices including the pressure responsive means of said regulator and/or a differential pressure meter.

In the preferred specific embodiment of the invention the point of low pressure is produced by a combination of orifice plate and inserted Venturi tube section, the combination being secured in a body portion adapted to form substantially a continuation of the low pressure main in which it is inserted. Such a device has a much higher percentage of recovery than an orifice plate alone, and is only a few inches in length and therefore can easily be placed in a regulator pit. The throat of the inserted Venturi section is connected by a conduit to the diaphragm chamber of the regulator.

When it is desired to cut down the boost developed in this device, a normal pressure point in the main is connected by a conduit through an adjustable valve with the throat of the Venturi section, and by proper adjustment of this valve the flow through the conduits from the point of normal pressure to the throat of the Venturi section is controlled to produce a pressure gradient and any point of this gradient can be connected to the regulator to control the boost in the main. For the sake of simplicity and compactness the normal pressure point is selected in the body portion so that all pipe connections are made thereto. However, it is more convenient to select a point for connection to the regulator and control the pressure gradient at such point. This is preferably accomplished by providing two restrictions in said conduits, one or both of which are adjustable, the space therebetween providing a control chamber within which practically the entire pressure gradient occurs, the regulator being connected to said control chamber.

The measurement of flow in connection with the booster is accomplished by connecting a conventional orifice meter gauge with the points of normal pressure and the throat of the Venturi section, and as the regulator is connected to the control chamber the orifice meter is not affected by changes in the valve to adjust the pressure gradient in the control chamber.

Accordingly, it is one object of the present invention to produce a pressure differential in a fluid distributing system to operate a pressure boosting apparatus and a differential pressure measuring device so that variations in rate of flow will not render inoperative the pressure differential measuring device.

Another object of the present invention is to provide an apparatus for controlling the pressure in a fluid distribution system in accordance with variations in demand to maintain pressure at or above a predetermined value in all parts of the system.

Another object is to provide novel apparatus for regulating fluid pressure in accordance with fluid flow so as to boost the pressure in the main when the fluid flow increases.

A further object is to simulate the pressure conditions at the low pressure point in the main at a point in the vicinity of the regulator and boost the pressure in the main to keep the simulated pressure constant at various rates of flow.

A further object is the provision of a differential pressure producing device which is compact and has a high ratio of recovered pressure to operate as a pressure booster.

A further object is to multiply the pressure drop across a restriction in the main to secure a pressure differential to operate a volume measuring apparatus, which differential will remain great enough under varying conditions of demand to operate the volume measuring apparatus.

Other objects are to provide a device for creating and transmitting a differential pressure, which is compact, simple and inexpensive to manufacture, and can be placed in existing regulator pits, which can be adjusted with precision, and can be replaced with a minimum of labor.

With the foregoing objects in view, as well as others that will appear from the following disclosure and the scope of the appended claims reference will be had to the accompanying drawings forming a part thereof, and in which Figure 1 is a view partly in section showing the combined pressure regulator and differential pressure measuring device; Figure 2 is a detail sectional view of the insert and connections; Figure 3 is a detail cross-section view of the safety regulator taken on line 3—3 of Fig. 2; Figure 4 is a schematic view of the boosting apparatus; Figures 4A, 4B, and 4C are graphs based on the diagrammatic showing in Figure 4; Figure 5 is a diagrammatic view of a pressure distribution system; Figure 6 shows a modification of the pressure differential producing means; Figure 7 shows the variations in pressure difference produced by various sized orifice plates; Figure 8 shows the variation in boosting and metering coefficients and Figure 9 shows a partly diagrammatic proving apparatus for determining the curves in Figures 7 and 8.

Referring to the drawings, the numerals 1 and 2 represent high and low pressure mains respectively with a regulator body indicated by the numeral 2' and a valve therein indicated generally by a numeral 3 therebetween. The valve 3 is connected by a fulcrumed lever 4 to the operating stem 5 of a pressure responsive device indicated generally by the numeral 6 having a pressure responsive means such as a diaphragm 7 therein of suitable construction and a sealing diaphragm 8 to separate the fluid pressure regulating chamber 9 from the pressure in the regulator body 2'. The diaphragm 7 is weighted in any suitable manner, as by a weight 10. The low pressure main 2 has inserted therein, at a suitable distance from the regulator body 2' an insert comprising a hollow cylindrical body member 11 suitably clamped by bolts 12 between the flange 13 of the regulator body and flange 14 of an adjacent pipe section of the main. The body member 11 is provided with an orifice plate 15 therein, suitably secured to the internal shoulder 16 as shown in Figure 2. The body member 11 also has a hole 20 therein through which passes the pipe or conduit 21, which at one end is threaded into the body of an inserted Venturi section 22 positioned centrally and in stream line relation in the opening of orifice plate 15. The inserted Venturi section 22 consists of two parts, a main body 23 having a concentric threaded recess 24 therein, and a threaded portion 25 which is threaded into the recess 24 in the main body so as to leave at the throat of the Venturi section an annular passage 26 which communicates by connecting passages 27 and 28 with the interior of the conduit 21. A channel 29 in the body member 11 communicates with a connecting channel 30 which has a hollow extension 31 suitably threaded therein, thereby providing an avenue 32 between the extension 31 and the conduit 21.

As is well known, when an orifice plate, such as 15, is inserted in a pipe a pressure drop is produced and the area of minimum pressure known as the vena contracta is a short distance downstream from the orifice. It will be observed that the inserted Venturi section has its discharge approximately at the location of the vena contracta and therefore the flow of that portion of gas which goes through the Venturi section discharges directly into the vena contracta, so that a greater velocity is secured through the Venturi section than normally would be obtained, and hence a greater pressure drop is obtained at the throat of the Venturi section and at annular ring 26 than exists at the vena contracta. One of the advantages of this arrangement of an orifice plate to venturi is that within a very short space an area of extremely low pressure can be created and the overall pressure loss is much less than would be produced by an orifice plate alone which would be required to give the same reduction in pressure existing in the Venturi section. The pressure at annular ring 26 is proportional to the square of the velocity through the Venturi section.

At the exterior end of the extension 31 is secured a T-fitting 35 and inserted in one branch thereof is a ported body member 36 in which extends a longitudinal channel 37 therethrough terminating in a restricted portion 38 at its end which forms a seat 39 for a needle valve closure member 40 which will be hereinafter described in greater detail. A connecting L-shaped channel 41 in the ported body member communicates with a U-shaped pipe section 42 which in turn communicates with a suitably enlarged chamber 43 in the valve stem channel 44 of the bonnet member 45 suitably threaded into the ported body member 36. A valve stem 46 extends through the valve stem channel 44 and at its interior end is carried the needle valve closure member 40 which has tapered portions 47 and 48 at its ends. The valve stem 46 has a threaded portion 50 which engages the similar threaded portion 51 of the bonnet 45, and at its external end has a valve stem operating member 52 secured thereon, which preferably is graduated and may be read in connection with the reference point on band 53 secured adjacent thereto on the bonnet 45 to show the position of the needle valve with respect to the valve seat 58. A packing gland 54 engages in a suitable packing chamber 55 around the valve stem 46 to prevent leakage past the stem, and the spring 56 coacts with the bonnet and stem operating member to frictionally retard turning of and to position the valve stem and closure member.

It will be apparent that the construction so far described provides a control chamber 57 in the ported body 36, in which is located the valve closure member 40, and in effect is at the juncture of conduits 31 and 21. The tapered end 47 of valve closure member 40 is adapted to seat in the seat 39 to close completely or govern the size of the restriction 38, while the tapered portion 48 is adapted to seat on the tapered seat 58 to close completely or govern the size of the restriction 49 between the valve stem 46 and valve stem passage 44. The valve stem passage 44 communicates at enlarged chamber 43 with conduit 42, which in turn communicates with L-shaped passage 41, T-fitting 35, avenue 32 and eventually with the interior of the main through connecting passages 30 and 29. The restriction 38 communicates with the conduit 21 which in turn communicates with the low pressure area in the main through the connecting passages 28 and 27 and the annular recess 26 at the throat of the Venturi section 22.

The valve or control chamber 57 communicates with the regulator chamber 9 of the regulator or pressure responsive device 6 by a conduit 60. In effect, the valve chamber 57 is formed between two restrictions 38 and 49 the size of which can be governed by movement of the valve closure member, and the conduit 60 leads therefrom to the regulator chamber 9.

The boost limiting device comprises a cross conduit consisting of conduits 61 and 62 connecting on either side of the valve chamber 63 and separated by the wall 64 having a valve seat 65 therein. A valve closure member 66 is adapted normally to seat in said seat and prevent communication between conduits 61 and 62. Conduit 61 communicates with the T-fitting 35, and through avenue 32 and connecting channels 30, 29 with the interior of the low pressure main. Conduit 62 connects with the valve chamber 57, and through conduit 60 with the regulator chamber 9 of the regulator 6.

The action of the valve closure 66 is governed by the safety regulator indicated generally by the numeral 67 which contains a diaphragm 68 separating it into a regulator chamber 69 and a chamber 70 which is open to atmospheric pressure through the channels 71 in the vent cap 72. The diaphragm 68 may be loaded in any suitable manner, as by a spring 73, the tension of which is adjustable. The regulator chamber 69 is in communication with the conduit 61 as shown and is set to raise the valve closure member 66 from its seat and establish communication between conduits 61 and 62 when the pressure in conduit 61 raises above a predetermined maximum. This permits the pressure in conduit 61 to be transmitted through conduit 62, valve chamber 57 and conduit 60 to the regulator chamber 9 of the regulator 6, and will raise the diaphragm 7 therein to close the valve 3 and prevent the pressure from rising above the intended maximum.

The construction so far described relates to the regulator and pressure boosting arrangement. The boosting device varies the load the regulator carries, and in order to determine the load which each regulator in a network is carrying and adjust the regulator accordingly to carry its proper share of the load, a second pressure responsive device or metering device is incorporated with the booster, and the invention includes the combination of booster and metering device. The metering assembly comprises a casing 75 of conventional construction having low pressure and high pressure chambers 76 and 77 respectively therein, a connecting U-tube 78 adapted to contain mercury or other fluid, a float in one of the chambers and means for transmitting the motion of the float to a pen arm which marks on a chart the variation in differential pressure in the low and high pressure chambers of the meter. The meter itself is of well known construction and need not be described in greater detail.

On one side of the valve chamber 57 (Figures 2 and 4) and in advance of the restriction 49 is connected a conduit 81 which communicates with the high pressure chamber of the differential pressure meter. As shown in Figure 2, this conduit is connected to the T-fitting 35 in any suitable manner so that the pressure will be transmitted thereto from the main through connecting channels 29 and 30 and avenue 32. Past the far side of the valve chamber 57 and adjacent the restriction 38 is connected a conduit 80 which communicates with the low pressure chamber of the differential pressure meter.

The whole apparatus herein described is designed so that it can be set up on new installations or it can be placed in existing pits employed for protecting the regulators heretofore employed. In order to accommodate the regulator housing 2' the main 2 is cut, as at 90, and a pipe section having the flange 14 at its opposite end is connected thereto by a sleeve 91 having the internal flange or shoulder 92 thereon to limit movement of the sleeve on the pipes. A pair of tapered gaskets 93, 94 are placed at the ends of the sleeve between the sleeve and the pipe sections, and follower rings 95, 96 are adapted to be clamped in place by the bolts 97 to firmly secure the sleeve in place. It will be apparent that by this arrangement the pipe section 2 can be moved longitudinally merely by releasing the sleeve 91 to permit removal or replacement of the insert 11.

The operation of the invention can be described best by reference to the diagrammatic view in Figure 4. In setting up and adjusting the apparatus the restriction 49 is closed, which opens restriction 38 and subjects regulator chamber 9 to the full effect of the low pressure in the Venturi section 22. The pressure gradient on the line A—A is shown by the curve in Figure 4A. Given a constant flow in the main, as the gas flows through the orifice plate 15 and Venturi section 22, it causes a reduction in pressure as indicated by the point $a$ on the curve A, Figure 4A which is almost completely recovered as indicated by the line $a'$, the slight pressure loss being characteristic and due to the orifice and Venturi section. Under such condition the pressure gradient through the center of the main is a straight line until the Venturi section is reached where it is rapidly lowered to the minimum pressure at the throat of the Venturi section, and then gradually is raised again as it leaves the Venturi section to the low pressure main. The curve $a''$ shows the pressure drop that would be caused by the orifice alone.

Now if it is assumed that the flow remains the same and the valve closure member 40 is moved to open restriction 49 and still keep restriction 38 open, a flow takes place from the regulator body 2' through passages 29, 30, avenue 32, L-shaped passage 41, tube 42 and passage 44 into valve chamber 57 through the restriction 49, producing a lowering of pressure through the circuit traced which occurs mainly at restriction 49 as shown by the curve B in Figure 4B which shows the pressure gradient on line B—B, Figure 4. The flow further continues through the valve chamber as shown by the horizontal portion of the curve B designated $c$ to the restriction 38 where another pressure drop occurs, and from the restriction 38 the pressure drops more or less gradually through passage 37 and conduits 21, 28 and 27 to the annular channel 26 to the throat of the Venturi section as indicated by the curve from $c$ to $a$, the point $e$ on the curve indicating the metering connection 80. Given conditions of constant pressure in the regulator body 2' and main 2, and a constant flow through the Venturi section, the effect of regulator 6 being ignored for the present, the curve B thus traced will represent the pressure gradient from the regulator body 2', passages 29, 30, avenue 32, L-shaped passage 41, tube 42, passage 44, restriction 49, valve chamber 57, passage 37, conduits 21, 28, 27 to annular channel 26 at the throat of the Venturi section. As the pressure drops in this course take place mainly at restrictions 49 and 38, it will be apparent that by varying these restrictions the pressure in valve chamber 57 can be controlled between maximum and minimum limits and the pressure at point $e$ also will be varied. Thus, if restriction 38 is opened fully and restriction 49 is closed, the pressure in valve chamber 57 will be practically the same as at the throat of the Venturi section, and the curve showing the pressure gradient through the aforesaid conduits will be as shown by curve $B''$ in Figure 4B, and if the restriction 49 is opened less than for curve B the pressure in chamber 57 will be lower as indicated by the horizontal portion $c'$ of the curve $B'$ and the point $e$ will be lower, as shown by $e'$, the initial horizontal portions of the curves B, $B'$, and $B''$ being coincident. As the flow in each instance is assumed to be the same, the low point $a$ and recovery $a'$ for each of the curves B, $B'$ and $B''$ will be practically the same as in Figure 4A. Thus it will be seen the pressure in valve chamber 57 as shown by the horizontal parts $c$, $c'$, and $c''$ of the curves B, $B'$, and $B''$ can be varied up or down with relation to the pressure at the throat of the Venturi section by proper adjustment of the needle valve.

The pressure in valve chamber 57 is affected only by adjustment of the needle valve when the flow through main 2 is constant, but it is apparent that with a fixed setting of the needle valve any variation in flow in main 2 will likewise cause a variation in the pressure in chamber 57 which would be indicated on the curve B by a shifting up or down of the horizontal part $c$. The regulator 6 is connected by conduit 60 to the valve chamber 57, and as the regulator is weighted to maintain a constant pressure, it will tend to maintain the pressure in control chamber 57 constant regardless of the pressure in main 2, which pressure in control chamber 57 is shown in the curves by the horizontal sections $c$, $c'$, and $c''$ becoming fixed and coinciding while the variation in flow causes the rest of the respective curves to shift as shown in Figure 4C. Consequently under conditions of constant flow with the regulator 6 connected, when the restriction 49 is closed the pressure gradient on the line B—B is shown by curve $B''$, Figure 4C, and the position of horizontal line $c''$ will be determined by the amount of the weight 10 on the diaphragm 7, and the remainder of the curve will be displaced in maintaining the line $c''$ at this constant value as shown. However, if the needle valve is set the same as shown by curve B in Figure 4B, the flow meanwhile being constant, the resulting pressure change tendency in chamber 57 is registered by the regulator 6 acting to maintain the pressure in chamber 57 constant, and the valve 3 will be throttled somewhat by the regulator 6, thereby causing a lowering in the pressure in regulator inlet 2' and in main 2, and the curve B will assume the form and position shown in Figure 4C, the line c coinciding while the line c" of the curve B" and the parts of the curves B and B" shown coincident in Figure 4B now will become separate. Thus, the initial coincidental horizontal parts of the curves B and B" in Figure 4B become in Figure 4C A and A" respectively, and the recovery lines become a' and b' respectively. The pressure drop from A to b will be the same as from A" to a, as the flow through main 2 is constant, and the recovery from b to b' will be the same as from a to a'.

Let it be assumed that at a certain condition of flow through the main 2 and with the stem operating member 52 set at the graduation 4 in line with the reference mark on scale 53, the curve B, Figure 4C represents the pressure gradient on the line B—B. With this setting, let it be assumed the flow through main 2 increases, due to increased consumer demand. This increase in flow will produce a greater overall pressure drop between the points A and b, with the result that the whole pressure gradient on the line B—B from A to b will be shifted in proportion, including the pressure in chamber 57, and as the regulator 6 tends to keep the pressure in chamber 57 constant, the effect is to increase the pressure difference from A and b'. The curve D Figure 4C represents this effect of change in flow. From an inspection of the curve it will be seen that the pressure in inlet 2' has risen to the point A', the metering point has risen to e", and the pressure in main 2 has risen to b", the difference between the lines b' and b" being the boost. Any further increase in demand will act in the same way to increase or boost the pressure in main 2 until the predetermined limit of boost is reached for which the regulator 67 is set. When this limit is reached the pressure in the conduit 61 opens the valve 66 the necessary amount to admit pressure into the valve chamber 57, and it will be evident that any tendency to increase the pressure in the regulator casing 2' merely opens the valve 66 further so as to maintain a constant pressure difference between the regulator casing 2' and valve chamber 57. Consequently, if the pressure in chamber 2' tends to increase it will tend to increase the pressure in chamber 57, and as the regulator 6 resists any increase in pressure in chamber 57 above the setting of weights 10, it will act to close the valve 3 and maintain the pressure at 57 and in main 2 at the predetermined maximum. When the peak demand has passed and flow starts to decrease, the converse action takes place until the pressure in the regulator outlet 2' and main 2 reach the predetermined minimum for which the valve member 40 is set, this being the line b' as shown in Figure 4C.

The differential pressure meter 75 is operated by pressure conducted thereto through the high pressure conduit 81 and low pressure conduit 80. As the avenue 32 is relatively large and has the restriction 49 at its end, the pressure transmitted through conduit 81 will be substantially that in the low pressure main 2' at the line A—A, and is represented in Figure 4C for curves B, B", and D by the points A, A", and A' respectively, and as the conduit 21 widens past the restriction 38 and the conduit 80 is connected at this point, the low pressure transmitted to the meter will be the pressure at e. The pressures at points A' and A", Figure 4C, will vary for different settings of the needle valve 40, as will likewise the pressures at the points e' and e". Consequently in using the differential pressure meter in connection with the pressure boosting arrangement it is necessary to determine the constant or metering coefficient for different settings of the needle valve, and multiply the reading of the meter at that setting of the needle valve by the constant for that setting to obtain a correct reading of the flow through the main. The calibration on the needle valve enables an operator to set the apparatus for a predetermined boost, and also permits the use of a differential meter in the system. Were no calibrations employed it would neither be possible to calibrate the meter nor find a constant for the meter because flow conditions could not be duplicated.

In the calibrating arrangement shown in Figure 9, like numerals correspond to like parts. The insert 11, orifice plate 15 and inserted Venturi section 22 are placed in a conduit 101 which is connected to a supply of gas that can be controlled by a manually operated valve (not shown) to maintain the flow constant. A carefully machined orifice plate 102 is inserted in the discharge end of the pipe or conduit 101 and has a manometer 103 connected across the two sides of the plate 102. The flow of gas through the orifice 104 produces a pressure differential which causes a difference in level in the liquid in the two arms of the manometer 103. The quantity of gas flowing through the orifice 104 for a given time and a given differential pressure can be calculated from the orifice formula $$Q = K\sqrt{H}$$

the constant K for the orifice 104 being known, where Q is the quantity of liquid and H is the differential pressure.

The conduit 62 in Figure 2 is replaced in Figure 9 by a conduit 105 connected with one arm of the manometer 106, while the other end of the manometer 106 is connected by a conduit 107 to a point in the pipe 101 past the discharge of orifice plate 15. It will be apparent that when restriction 49 is closed by valve closure 40 the difference in height of the liquid columns in manometer 106 represents the difference between the pressure transmitted from the Venturi section 22 to the valve chamber 57 and the recovered pressure in the conduit 101, which is shown on the curve in Figure 4A as the difference between point a and line a'. For convenience this will be designated $H_r$. The metering conduits 80 and 81 are replaced in Figure 9 by the conduits 110 and 111 respectively connected to the arms of a manometer 112. With restriction 49 closed the difference in height of the liquid columns in manometer 112 represents the difference between the pressure transmitted from the Venturi section 22 to the conduit 110 and the original pressure of the gas at passage 29. On the curve in Figure 4A, this is shown as the difference between the point a and the initial horizontal part of curve A. For convenience this is designated as $H_d$. $H_d$ is always greater than $H_r$, as will be apparent from the curve in Figure 7 wherein $H_r$ represents the recovery pressure from a to a'. For a given size pipe the quantities $H_d$ and $H_r$ will vary for different sizes of orifice plates and for different rates of flow. In Figure 7 the rate of flow is plotted against pressure difference with needle valve setting at zero, the curves N and N' representing respectively $H_d$ and $H_r$ for a certain size pipe when a certain size orifice plate 15 is employed, and the curves M and M', L L' and K K' represent these values for other orifice plates having smaller orifices. The curves in Figure 7 hold good for $H_d$ and $H_r$ only when restriction 49 is closed, and restriction 38 is fully open.

When valve member 40 is moved to an intermediate position between the restrictions 38 and 49 shown for the curve B', Figure 4B, it will be seen that because the metering connections are on either side of restrictions 38 and 49 the pressure difference indicated by manometer 112 will no longer be $H_d$ but will be the difference between the point $e'$ on curve B' and the coincidental initial horizontal portion of B'. For convenience this value is designated as $H_m$, and the difference in pressure between the valve chamber 57 designated on the curve by horizontal line $c'$ and the horizontal portion of the curve at $a'$ is the loading effect or boost and is designated as $H_b$. In Figure 9, $H_b$ is measured by manometer 106 with the restriction 48 open. It will be apparent that as the values of $H_d$ and $H_r$ with the needle valve setting at zero are known, this being shown by the curves in Figure 7, the values of $H_m$ and $H_b$ could be computed for any setting of the needle valve if the proper coefficient were known to correlate these values.

In figure 8 the needle valve setting as indicated by the graduations on member 52 is plotted against the adjustment coefficient. The curve $C_m$ represents the adjustment coefficient for converting $H_d$ to $H_m$.

By the general orifice formula (1) $$Q = K\sqrt{H}$$

In each case Q is known because it has been measured by the orifice 104 and manometer 103. As applied to the curves in Figure 7, we have the formula (2) $$Q = K_d\sqrt{H_d}$$

As the volume remains constant, it will be apparent that for given position of the needle valve the values $H_d$ and $H_m$ bear a definite relation which is indicated by the constant $C_m$ in the formula (3) $$C_m = \frac{H_m}{H_d}$$

or (4) $$\frac{H_d}{H_m} = \frac{1}{C_m}$$

Likewise, for a given position of the needle valve Formula (2) becomes (5) $$Q = K_m\sqrt{H_m}$$

substituting this value for Q in Formula (2)

(6) $$K_m\sqrt{H_m} = K_d\sqrt{H_d}$$

or (7) $$K_m = K_d\sqrt{\frac{H_d}{H_m}}$$

substituting from Equation (4) in this formula (8) $$K_m = K_d\sqrt{\frac{1}{C_m}}$$

simplifying (9) $$K_m = \frac{K_d}{\sqrt{C_m}}$$

Thus, as the value of $C_m$ for a given setting of the needle valve can be found from the curve in Figure 8, and the value $K_d$ can be found from the curve in Figure 7 by assuming $H_d = 1$, the constant $K_m$ in Formula (5) becomes known. To calculate volume, Formula (5) is used wherein the square root of the reading of the differential pressure of the orifice meter is multiplied by the value of $K_m$.

The curve $C_b$ in Figure 8 represents the adjustment coefficient for correlating $H_r$ to $H_b$. For finding this coefficient $C_b$ for the boost or loading effect, the procedure is slightly different as we cannot say, referring to Figures 4A and 4B, that the boost or recovery $H_r$ with needle valve closed is proportional to the boost $H_b$ with the needle valve open. These pressures are not directly correlated since the pressure in pipe 101 is not affected by the adjustment valve. However, the differential pressure $H_a$, which is the difference in pressure between the conduit and the control chamber 57, is proportional to $H_d$ which proportion is indicated by a constant $C_b$ as follows:

(10) $$H_a = C_b \cdot H_d$$

(11) the value $H_d - H_r = H_l$ from Figure 4A, subtracting $H_l$ from both sides of Equation (11)

(12) $$H_a - H_l = C_b \cdot H_d - H_l$$

(13) $$H_a - H_l = H_b$$

(14) $$H_b = C_b \cdot H_d - H_l$$

In this formula it is likewise possible to find the value of $C_b$ for a given setting of the needle valve from the curve in Figure 8, $H_d$ can be found from the curve in Figure 7, $H_l$ can likewise be found from this curve and $H_b$ can therefore be calculated. In this way it can be determined beforehand what boost will be produced by a given setting of the needle valve.

The relation of the various regulators of a gas distribution system will be seen in Figure 5 wherein numeral 85 indicates a gas manufacturing plant or other source of supply, the double lines 86 represent high pressure mains, 87, 87', etc. represent the present improved regulator, and 88 represents the low pressure mains. As shown by the lines 89, the sphere of influence in the low pressure main of the various regulators is irregular and indefinite and overlap as shown by the broken lines. The regulators themselves usually are placed wherever experience shows them to be needed, and without reference to any geometrical plan. Considering for example, regulators 87, 87', and 87'', it will be seen that the sphere of influence of these regulators is overlapped, and that although the pressure at each regulator may be the same it still will be possible for one or more regulators to carry more than its share of the load, and heretofore no satisfactory way was known for determining how the load was being distributed. However, by incorporating the present improved meter with the regulator the actual flow through the regulator can be determined, and the needle valve 40 then can be set in each regulator to properly distribute the load.

Figure 6 shows a modification in which the orifice plate 15 is in advance of the Venturi section, and the mouth of the Venturi section is placed at the vena contracta. In this construction the pressure transmitted through the channel 29 and avenue 32 will be downstream pressure, but the principle of operation will be substantially the same as the modification of Figure 2.

The invention may be embodied in other specific forms without departing from the spirit or essential characteristics thereof. The present embodiment therefore is to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In an apparatus of the character described, the combination of high and low pressure mains, valve means controlling passage between said mains, a body portion adapted to be inserted in the low pressure main between two pipe sections to form substantially a continuation thereof, an orifice plate secured to said body portion, a Venturi section adjacent said orifice plate and attached to said body portion and arranged to discharge adjacent the vena contracta of said orifice plate, a conduit connected for flow between the minimum pressure area of the inserted Venturi section and the surrounding area in the body portion adjacent said orifice plate, and pressure responsive means connected to said conduit for operating said valve means.

2. In an apparatus of the character described, the combination of high and low pressure mains, a valve between said mains, a pressure responsive chamber having means connected to said valve for controlling flow between said mains, a restriction in the low pressure main to provide a differential pressure therein, a Venturi section adjacent said restriction and arranged to discharge adjacent the vena contracta of said restriction, a conduit connected to flow between the low pressure main and said Venturi section and having a control chamber therein, a valve in said control chamber for governing the pressure therein by controlling the flow therethrough, and a second conduit connecting said control chamber and pressure responsive chamber.

3. In an apparatus of the character described, a low pressure main, an insert removably located in the main comprising a restriction in said main, a Venturi section within the low pressure main and adjacent said restriction, a pressure responsive device, a conduit for transmitting the pressure in said main to said pressure responsive device, a second conduit for transmitting the pressure in the Venturi section to said first conduit and providing a control chamber therebetween, valve seats in said control chamber, an adjustable valve closure member cooperating with said seats for controlling the pressure transmitted through said conduits, and a third conduit connecting the control chamber with the pressure responsive device.

4. In an apparatus of the character described, the combination of high and low pressure mains, a valve between said mains, a pressure responsive chamber having means connected to said valve for controlling flow between said mains, an insert removably located in the low pressure main and forming substantially a continuation thereof, an orifice plate in said insert, a Venturi section in said insert adjacent said orifice plate and arranged to discharge adjacent the vena contracta of said orifice plate, a conduit connected to said insert on one side of said orifice plate and connected to said Venturi section and having a control chamber therein, a valve in said control chamber for governing the pressure therein by controlling the flow therethrough, and a second conduit connecting said control chamber and pressure responsive chamber.

5. In a pressure control system, the combination comprising high and low pressure mains, valve means controlling passage between said mains, pressure responsive means connected to operate said valve means, an orifice plate in the low pressure main, a Venturi section within the low pressure main adjacent said orifice plate and arranged to discharge adjacent the vena contracta of said orifice plate, a conduit connected for flow between the throat of said Venturi section and the low pressure main adjacent said orifice plate, a second conduit connected to said pressure responsive means and first conduit, and a valve in the first conduit to control flow therethrough for determining the pressure in said pressure responsive means.

6. In an apparatus of the character described, the combination of high and low pressure mains, valve means controlling passage between said mains, an insert removably located in the low pressure main constituting a body portion and having a restriction to provide a differential pressure therein and having means for multiplying the pressure differential, an extension from said body portion constituting a conduit for transmitting pressure from said main to a pressure responsive device, a ported body secured to the end of said extension and having a control chamber therein and valve seats, a bonnet member secured to said ported body, a double acting control closure member in said control chamber cooperating with said seats, and a valve stem secured thereto and passing through said bonnet member.

7. In an apparatus of the character described, a low pressure main, an insert removably located in the low pressure main, an extension on said insert constituting a conduit for transmitting pressure from said main, a T-fitting secured to said extension, a second conduit within said extension providing an avenue therebetween, a ported body having the second conduit secured thereto, said ported body being secured to one branch of the T-fitting, and having a valve chamber therein and a passage connecting the valve chamber and second conduit, a bonnet member secured to said ported body and having a valve stem channel therethrough, a conduit connecting said avenue and said valve stem channel, a valve in said valve chamber, and a valve operating stem in said valve stem channel.

8. In an apparatus of the character described, the combination of high and low pressure mains, valve means controlling passage between said mains, pressure responsive means connected to operate said valve means, an orifice plate in the low pressure main, a Venturi section within the low pressure main adjacent said orifice plate and arranged to discharge adjacent the vena contracta of said orifice plate, a conduit connected for flow between the throat of said Venturi section and the low pressure main adjacent said orifice plate, and a second conduit connected to said pressure responsive means and first conduit.

9. In an apparatus of the character described, a low pressure main, an insert removably located in the main and constituting a restriction therein, a Venturi section fixed within the low pressure main and adjacent said restriction and arranged to discharge adjacent the vena contracta of said restriction, a pressure responsive device, a control chamber, a conduit for transmitting the pressure in said main to said control chamber, a second conduit connected with said control chamber and Venturi section, a valve closure member adjustably located in said chamber to govern the pressure therein by the flow therethrough, calibrated means extending through said chamber for operating said valve to show the position thereof, and a conduit connected to said control chamber and pressure responsive device.

10. In an apparatus of the character described, the combination of high and low pressure mains, a regulator including valve means controlling passage between said mains and pressure responsive means for operating said valve means, a restriction in the low pressure main to provide a differential pressure therein, means for multiplying the pressure differential, a conduit connected for flow between the low pressure main and pressure differential multiplying means, said conduit having a restriction therein to provide a control chamber, a differential pressure meter assembly having high pressure and low pressure chambers therein, conduits connecting the high and low pressure chambers with said first conduit outside said control chamber, and a conduit connecting said control chamber with said pressure responsive means.

11. In an apparatus of the character described, the combination of high and low pressure mains, a regulator including a valve for controlling passage between said mains and pressure responsive means for operating said valve, an orifice plate in the low pressure main to provide a differential pressure therein, a Venturi section in the low pressure main adjacent said orifice plate to multiply the pressure differential, a conduit connected for flow between the low pressure main and throat of the Venturi section, said conduit having a plurality of restrictions at least one of which is adjustable providing a control chamber therebetween, a differential pressure meter assembly having high pressure and low pressure chambers therein, conduits connecting the high and low pressure chambers with said first conduit outside said control chamber, and a conduit connecting said control chamber with said pressure responsive means.

ALLEN D. MacLEAN.
FRITZ NIESEMANN.